3,642,970
METHOD OF MAKING POROUS BODIES
Akira Hagitani and Yoshishige Morita, Tokyo, Japan, assignors to Daicel Ltd., Osaka, and Nippon Plawder Co., Tokyo, Japan
No Drawing. Filed July 9, 1969, Ser. No. 840,522
Int. Cl. B29f 5/02
U.S. Cl. 264—122    3 Claims

ABSTRACT OF THE DISCLOSURE

Porous thermoplastic bodies having a relatively high mechanical strength and a high and uniform porosity in the range of about 27% to 45% are made by filling a mold with spherical particles of a thermoplastic polymer containing from 0.3 to 5% of unreacted monomer and then heating the spherical particles to a temperature above the softening point, but below the melting point, of the polymer in the absence of externally applied pressure.

---

This invention relates to a method of making porous bodies which is characterized by (1) filling up a mold with sorted tiny spherical particles, having a narrow particle size range, of a high molecular weight thermoplastic polymer prepared by a suspension polymerization process and which contain monomer and/or low molecular polymer that will be able to dissolve or swell the polymer and then (2) heating said spherical particles in the mold without application thereto of any intentional pressure to cause the tiny spherical particles to fuse with each other while substantially retaining their spherical shape.

Although a high molecular weight polymer in the form of tiny spherical particles (hereinafter referred to as "beads"), which is obtained by suspension polymerization, consists in general of spheres of substantially identical particle size, it can be further sorted out to obtain particles of a defined narrow particle size range. When the thus sorted beads are packed into a desired shape and thickness, they contact each other through contact surfaces corresponding to the pressure imposed thereto on packing and/or based on their own weights and there remains among the beads spaces of a regular three-dimensional structure corresponding to a closest-packed arrangement to a loosest-packed arrangement including cubic monoclinic, body-centered cubic, tetragonal, closest-packed hexagonal and like systems of packing spheres. If it is possible to fuse the beads forming the packed body only the contact points therebetween, there will be obtained a porous body having uniform openings of an ideal shape and which can be suitably used as a filter material.

In known methods for making porous bodies, amorphous powders of a high molecular weight polymer are adhered together by means of, e.g., sintering, solvent adhesion or binders. However, in such methods, even if the granularity of the powders is made uniform there is obtained a porous body having poor mechanical strength, because each particle is not uniformly adhered to adjacent particles due to their amorphous shapes, and , if the particles are compressed on order to enhance the strength of the resulting porous body, there is obtained a porous body of a decreased porosity. In addition, the irregularity in shape and/or size of powders results in non-uniformity in the shapes and size reduces of the openings in the resulting porous body and, consequently, the efficiency of the resulting porous body as filter material.

In contrast, the porous body obtained according to the method of the present invention has a high mechanical strength because, in the porous body of the present invention, all the particles are spherical particles of substantially a uniform size and shape and, accordingly, they contact and are fused with all of the adjacent particles. The porous body is ideally suited for use as a filter material in view of the uniformity in size and in distribution of the openings or interstices between the particles.

In order to make a porous body by adhering such tiny spheric particles of a high molecular weight to each other, various methods will be considered. Namely, in one possible method, the beads can be stuck together by the aid of a binder applied to the surface of each bead. However, this method has a drawback that, because each bead is stuck to each adjacent one at single point, the resulting porous body is short of strength and brittle. In addition, this method requires several complicated processes for application of a binder to the whole surface of each bead and consumes a lot of a binder. Further, if a binder is used in a large amount for enhancing the strength of the product, the openings in the resulting porous body will be blocked up by the binder and this makes the permeability of the product small. Moreover, this method is unfavorable because the binder which is in most cases formed of a different substance from the one which constitutes the beads will have usually adverse effects on the inherent good chemical resistance and physical properties of the beads.

It is also possible to mold perfect beads under pressure at a temperature near the melting point of the beads. However, the porous body thus obtained has only a considerably lower porosity than that calculated from a closest and loosest-packed states of the beads because of the deformation of the beads during the molding.

In still another method, beads are sorted out to collect beads of a desired particle size and having a narrow particle size range. The sorted beads are contacted with a surface treating agent for a short period of time. Although a poor solvent for the polymer can be suitably used as such surface treating agent, a good solvent may also be used in mixture with a non-solvent which will be compatible with the good solvent. In this case, the surface treating agent will be absorbed by the surface of each bead and swells only the surface of each bead slightly. When packed into a desired shape, heated to a temperature below the melting point of the polymer and placed under pressure, if necessary, the beads will fuse together at the contact points therebetween and the surface treating agent present on the surfaces of the beads other than at said contact points will be mostly vapourized off. After the completion of the fusion, the excess of the surface treating agent will be purged by aeration to obtain an ideal porous body in which each sphere is stuck with adjacent ones only at the contact points therebetween.

It is believed that, when the beads are packed into a defined shape, each of the beads is supported by adjacent ones at the contact points therebetween, because they are true spheres, and there takes place a phenomenon of a drop of the melting point caused by the high pressure at the contact points. Further, the solvent will be adsorbed about the contact points in a larger amount than in the other areas since there is formed a capillarical small gap around the contact point. Consequently, a slight heating will promote the fusion and polymerization, especially the bridging between adjacent beads to further fasten the combination by fusion.

As will be evident from the above illustration, it is not necessary to carry out the treatment of the beads with the surface reating agent by soaking the beads in the latter so long as the surface of the particle is uniformly coated with the surface treating agent. The treatment may be attained by contacting the beads with a vapour of the treating agent for a predetermined time. Thus, a very small quantity of the solvent will be sufficient for the treatment. However, this method also has a drawback that a separate process for the addition of the treating agent will be necessary for the manufacture of porous bodies on an industrial scale according to this method and it will be necessary to use an excess of the treating agent to attain the uniform distribution of the added treating agent, because of the difficulty of effecting the uniform addition of a small and predetermined amount of the surface treating agent and that, although it will be possible to obtain a porous body as mentioned above under ideal working conditions, the quality of the product tends to vary over a wide range.

In addition, the solvent used may cause solvent cracking and has a tendency to lower the strength of the resulting porous body and also stain the porous body.

We further studied methods for obtaining such ideal porous bodies as above described without the accompanying defects of the methods as above described and have now found that the object is attainable by preparing beads of a polymer which is soluble in its monomer by suspension polymerization under such conditions that 0.3–5 wt. percent of monomer and/or low molecular weight polymer remains in the polymer, sorting the beads of a desired particle size and having a narrow particle size range and filling the sorted beads in a mold and heating the beads without imposing thereon any intentional pressure.

The advantages which can be brought about by the method of the present invention are: the procedure is simple because it is unnecessary to add a binder or solvent; it is possible to form an ideal shape of pores in the obtained porous body product, because the beads substantially retain their spherical shape, even if deformed, as the monomer and/or low molecular weight polymer is distributed uniformly in each bead and, consequently, there occurs no extreme softening of the surface portion of the bead; and, since the monomer content does not change much in converting from beads to porous body and there is no evaporation of a large quantity of combustible matters such as occurs in the case where a solvent is used, there is little risk of fire, no occurrence of distortion and other blemishes accompanied by evaporation of the solvent, substantially no deformation and shrinkage of the porous body and no change of the porous body with the passage of time.

The high molecular weight polymers suitably used in the practice of the method of the present invention includes those prepared by suspension polymerization and in which the polymer is soluble in the monomer of which it is made of, such as polystyrene, styrene-acrylonitrile copolymers, styrene-methacrylate copolymers, copolymers of styrene, methacrylates, vinyl-esters or the like, high impact styrene resin, ABS resin and the like.

The residual amount of the monomer and/or low molecular polymer in the polymer beads according to this invention should be 0.3 to 5%, preferably 1 to 3% (percent is by weight). The size of the bead is not critical and a homogeneous size distribution is most preferable as mentioned above, but a deviation is allowable up to three times the diameter of the smallest size beads. The heating temperature depends on the heating time and may be selected from the temperatures above the softening point but below the melting point of the polymer, taking into consideration the prevention of thermal deterioration and discoloration of the polymer, heat economy and uniform heating of the whole beads.

Thus, according to the process of the present invention, it is possible to easily and economically produce ideal porous bodies having from a closest-packed to a loosest-packed structure depending on the manner of packing of the beads. As a matter of fact, the porosity of porous bodies thus formed ranged from 27% to 45% and well coincided with the calculated values (25.95% for the closest-packed state and 47.64% for the loosest-packed state). A microscopic observation of a cross-section of the porous body indicated that the beads retained their spherical shapes, and the porous body possesed a strength sufficient for practical use.

The porous body thus formed consists of united spheres of substantially identical particle size and includes pores or openings regularly arranged in a three-dimensional structure, and affords a high refinement of filteration when used as a filter material, blows air bubbles of a uniform size throughout its whole surface and gives a high dispersing effect together with a stirring effect when used in a bubble pipe and has a lower resistance against permeation of fluid.

Further, since the porous body is produced by fusing spheres moderately without imposing any intentional pressure thereon, it is free from blocked pores and smooth-surfaces, so that it has a reduced tendency to be blocked by filter cake, and it is easily regenerated by back washing with a high restoration rate. The porous body obtained is formed of a synthetic resin, so that it is light and less easily broken during use, compared with those formed of ceramic, silica or glass, and it may be formed into a complicated shape without any difficulty, because the residual strain in the molded product is small due to the lower heating temperature during the manufacture, compared with that in the ceramic, silica or glass products.

The present invention will now be described with reference to the following examples.

EXAMPLE 1

Beads of a commercially available acrylonitrile-styrene copolymer obtained by the suspension polymerization of a substantially equimolar proportion of acrylonitrile and styrene, which have a particle size of 80 to 100 mesh and contain 2.5% of monomers, were packed into a space between an outer metallic tube of an inner diameter of 7 cm. and a length of 30 cm. and an inner metallic tube of an outer diameter of 4 cm. and a length of 10 cm. and were heated in an oven at 230° C. for 40 minutes. After cooling, a porous body of the shape of a pipe was withdrawn. The porous body thus obtained head a bulk density of 0.695 g./cc., a porosity of 35.1%, compression breaking load in the radial direction of 240 kg. and a compression breaking load in the axial direction of 3,500 kg.

EXAMPLE 2

A porous body of a bulk density of 0.670 g./cc., a porosity of 37.4%, a tube collapsing load (compression breaking load in the radial direction) of 140 kg. and a compression breaking load of 1,300 kg. was obtained by repeating the same procedure as in Example 1 except that there were used beads of the same copolymer but of a particle size of 10 to 20 mesh.

EXAMPLE 3

A porous body of the similar properties was obtained by using beads of the same copolymer but containing 0.9% of monomer in the procedure described in Example 2.

EXAMPLE 4

Beads of suspension polymerized methyl styrene polymer having a particle size of 40–60 mesh and containing 0.5% of monomer were packed into a similar mold as the one used in Example 1 and heated in an oven at 230° C. for 45 minutes. After cooling, a porous pipe was withdrawn.

EXAMPLE 5

Beads of a suspension polymerized polystyrene containing 1% of unpolymerized monomer and having a particle size of 20 to 30 mesh were packed into a similar mold as the one used in Example 1 and heated in an oven at 220° C. for 40 minutes to obtain a porous body of similar properties as in Example 1.

EXAMPLE 6

Beads of an ABS resin containing 1.5% of unpolymerized monomers and having a particle size of 20 to 30 mesh, which had been prepared by polymerizing a mixture of styrene and acrylonitrile containing dissolved therein a polybutadiene rubber partially under the conditions of the mass polymerization and then under the conditions of the suspension polymerization by converting the mixture to a suspension in an aqueous medium was heated in a similar mold as the one used in Example 1 at 220° C. for 40 minutes to obtain a similar porous body.

What we claim is:

1. A method for making porous bodies, which comprises:

filling a mold with a mass consisting of sorted tiny spherical particles consisting of a high molecular weight thermoplastic polymer containing uniformly distributed in each spherical particle from 0.3 to 5% by weight of unreacted monomer, said spherical particles having a narrow particle size range in which the diameter of the largest spherical particle is not in excess of three times the diameter of the smallest spherical particle, said spherical particles being in substantially point contact with each other and providing uniformly distributed interstices therebetween, heating said spherical particles in the mold, in the absence of externally applied pressure, to a temperature above the softening point, but below the melting point, of the polymer to fuse said spherical particles together at the contact points therebetween while said particles substantially retain their spherical shapes, and cooling said fused spherical particles and removing some from the mold to obtain a porous molded body consisting of united spherical particles of said polymer, said molded body having interstices of substantially uniform size and distribution throughout the entirety of the molded body between the spherical particles, and said molded body having a porosity of from about 27% to 45%.

2. The method as claimed in claim 1, wherein the amount of said unreacted monomer is 1–3% by weight.

3. The method as claimed in claim 1, wherein said high molecular weight thermoplastic polymer is selected from the group consisting of acrylonitrile-styrene copolymer, polystyrene, methyl styrene polymer and acrylonitrile-butadiene-styrene copolymer.

References Cited

UNITED STATES PATENTS 3,259,677    7/1966    Zwick _____ 264—126

FOREIGN PATENTS 737,111    9/1965    England _____ 264—126

ROBET F. WHITE, Primary Examiner

J. R. HALL, Assistant Examiner

U.S. Cl. X.R.

264—126